United States Patent
Albert et al.

(10) Patent No.: US 10,371,427 B2
(45) Date of Patent: Aug. 6, 2019

(54) LIQUID COLLECTION AND EVAPORATION DEVICE

(71) Applicant: Continental Automotive GmbH, Hannover (DE)

(72) Inventors: Eusebio-Marius Albert, Timisoara (RO); Vlad Parsan, Timisoara (RO); Alexandra Fanu, Carei (RO); Alexandru Giurgica, Arad (RO)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/951,326

(22) Filed: Apr. 12, 2018

(65) Prior Publication Data

US 2018/0306478 A1    Oct. 25, 2018

(30) Foreign Application Priority Data

Apr. 21, 2017   (EP) ..................................... 17465516

(51) Int. Cl.
| | | |
|---|---|---|
| *F16K 41/00* | (2006.01) |
| *F25B 49/00* | (2006.01) |
| *F25B 49/02* | (2006.01) |
| *B60H 1/00* | (2006.01) |
| *F25B 41/04* | (2006.01) |
| *F16K 41/02* | (2006.01) |
| *F01P 7/14* | (2006.01) |
| *F01P 3/20* | (2006.01) |

(52) U.S. Cl.
CPC ....... *F25B 49/027* (2013.01); *B60H 1/00885* (2013.01); *F16K 41/00* (2013.01); *F16K 41/026* (2013.01); *F25B 41/04* (2013.01); *B60H 2001/00307* (2013.01); *B60H 2001/00949* (2013.01); *F01P 3/20* (2013.01); *F01P 2007/146* (2013.01)

(58) Field of Classification Search
CPC .... F25B 49/027; F25B 41/04; B60H 1/00885; F16K 41/026; F16K 41/00
See application file for complete search history.

(56) References Cited

U.S. PATENT DOCUMENTS

2004/0227302 A1    11/2004   Burdick et al.

FOREIGN PATENT DOCUMENTS

| EP | 1724453 A1 | 11/2006 |
|---|---|---|
| GB | 2160662 A | 12/1985 |

OTHER PUBLICATIONS

Search Report dated Sep. 26, 2017 from corresponding European Patent Application No. 17 46 5516.7.

*Primary Examiner* — Jacob M Amick

(57) ABSTRACT

A liquid collection and evaporation device is proposed for use between a cooling water regulating valve of a vehicle and an actuator device for actuating the valve. The liquid collection and evaporation device includes a separation tank for collecting and evaporating liquid droplets emerging from the cooling water regulating valve. The separation tank here has a connection to the valve, a connection to the actuator device, and also a multiplicity of openings which firstly prevent the liquid droplets from emerging from the tank and secondly permit droplet evaporation because of waste heat acting on the tank. The invention furthermore relates to a valve unit with such a liquid collection and evaporation device, and to a vehicle with such a valve unit.

20 Claims, 6 Drawing Sheets

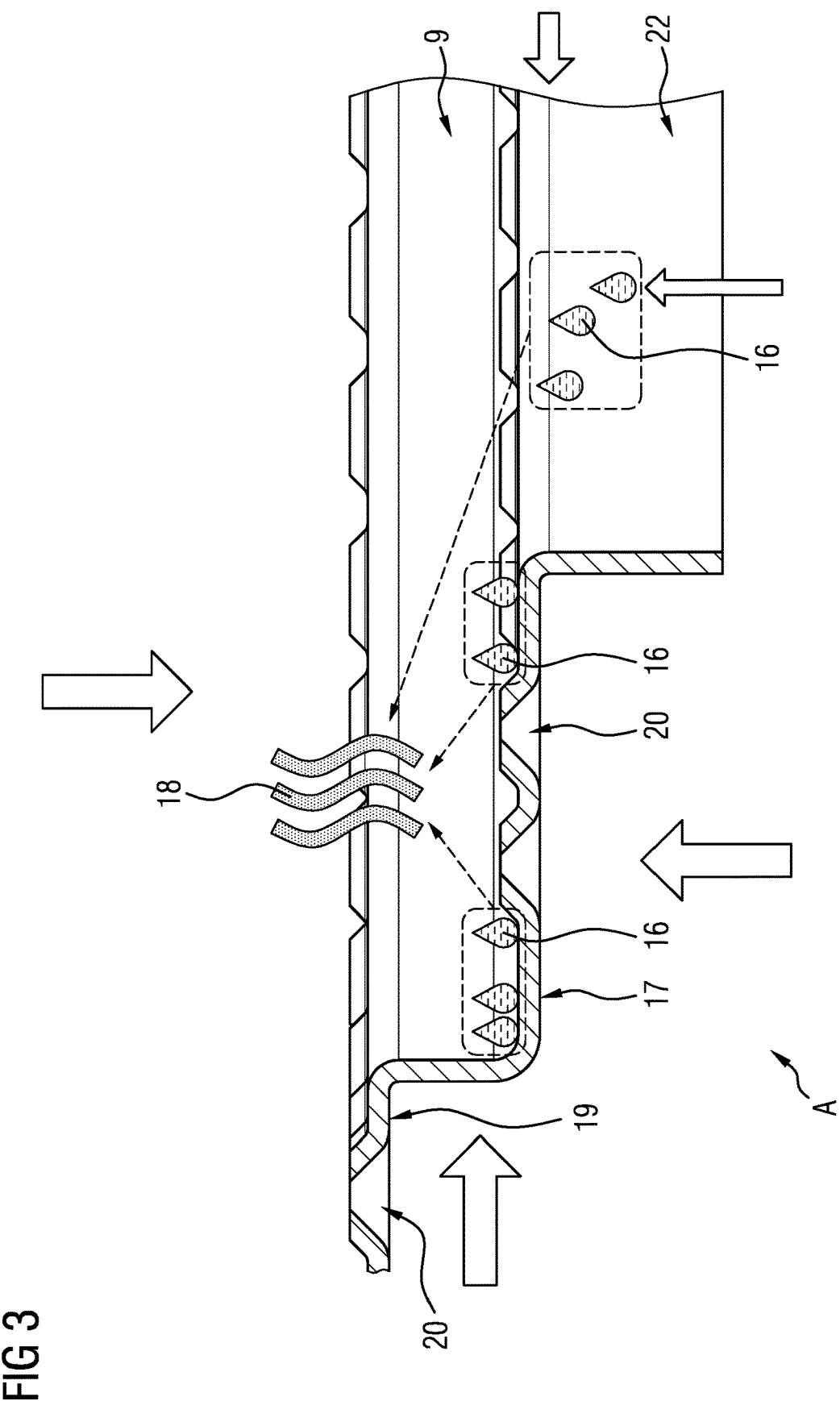

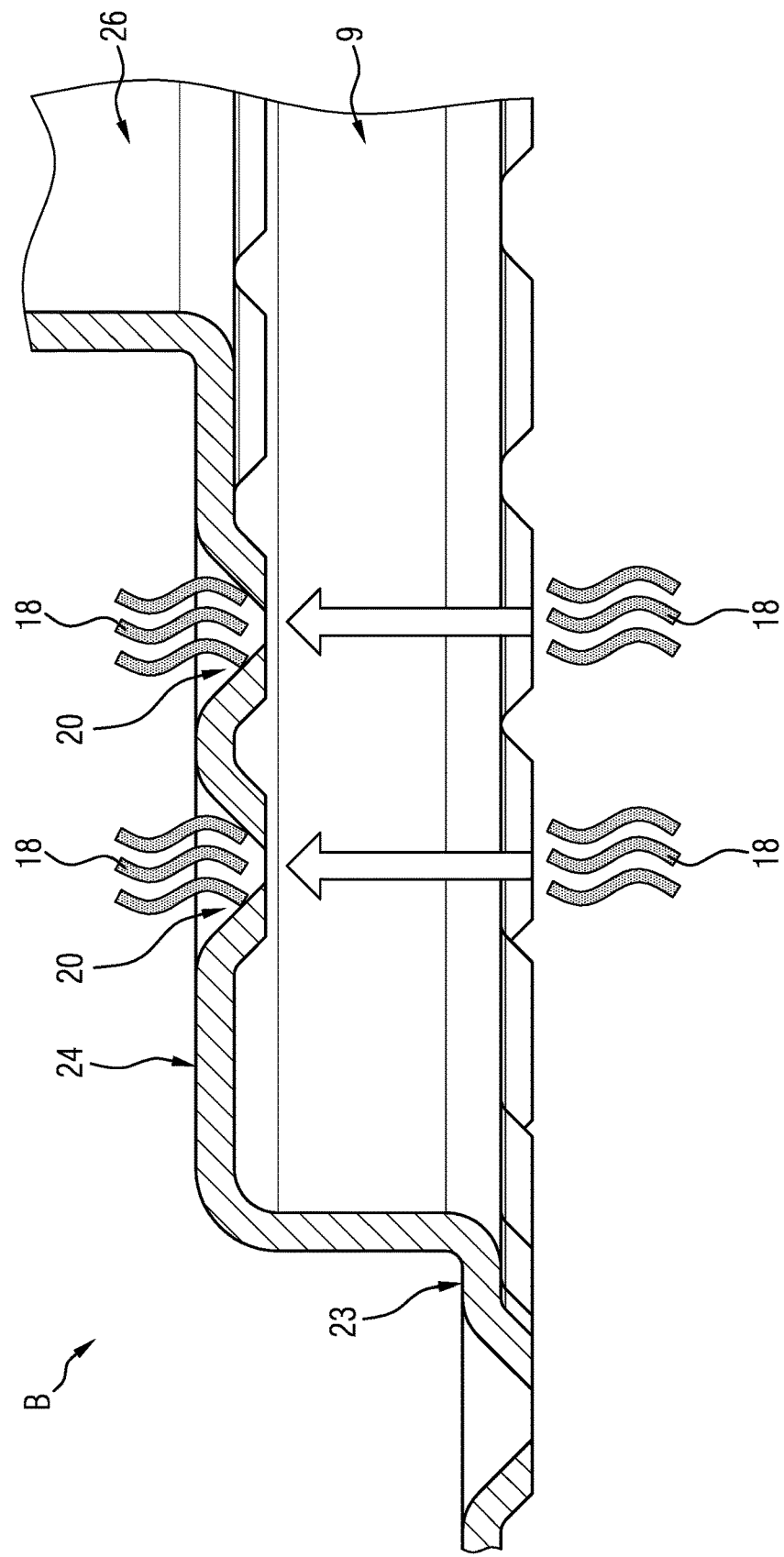

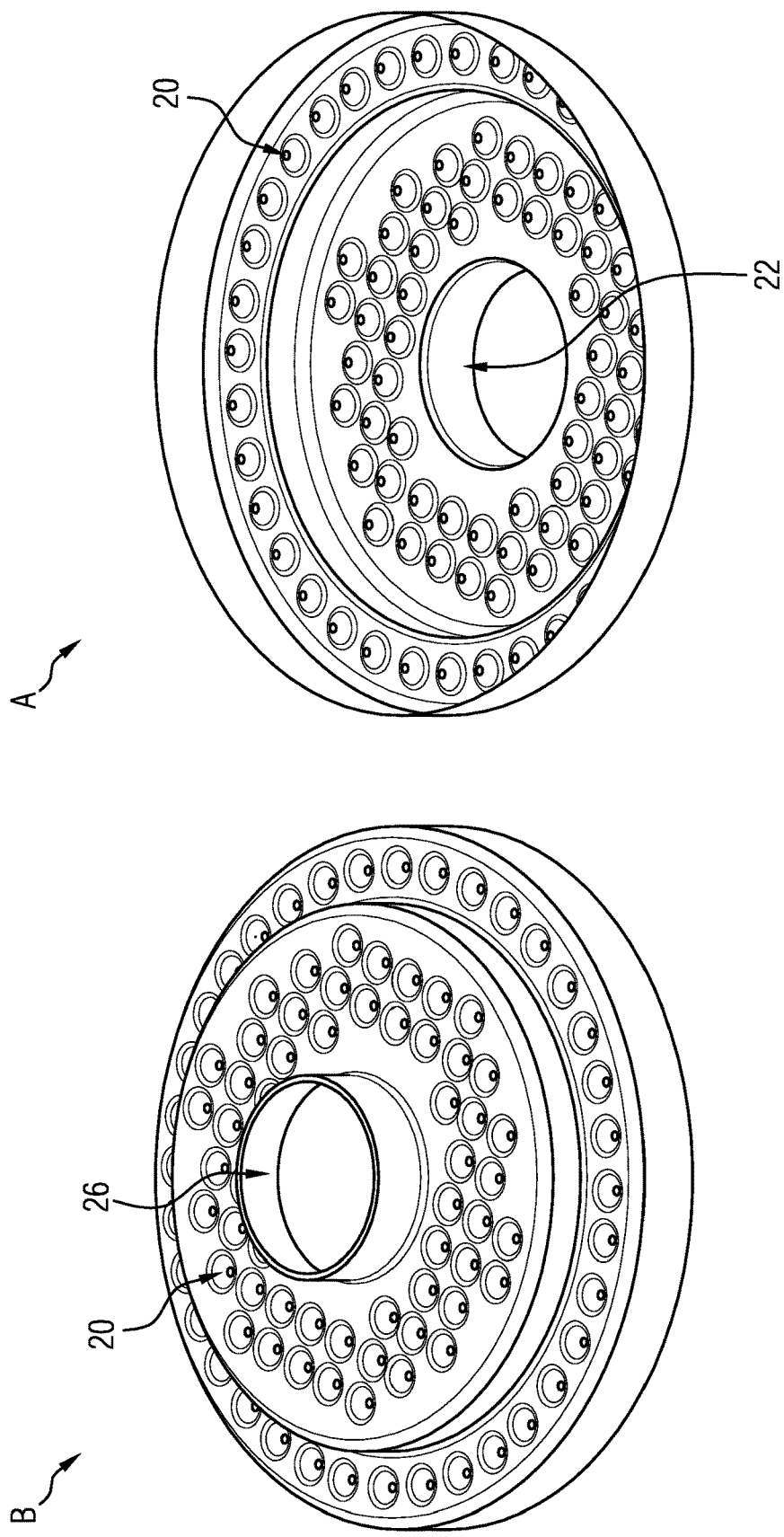

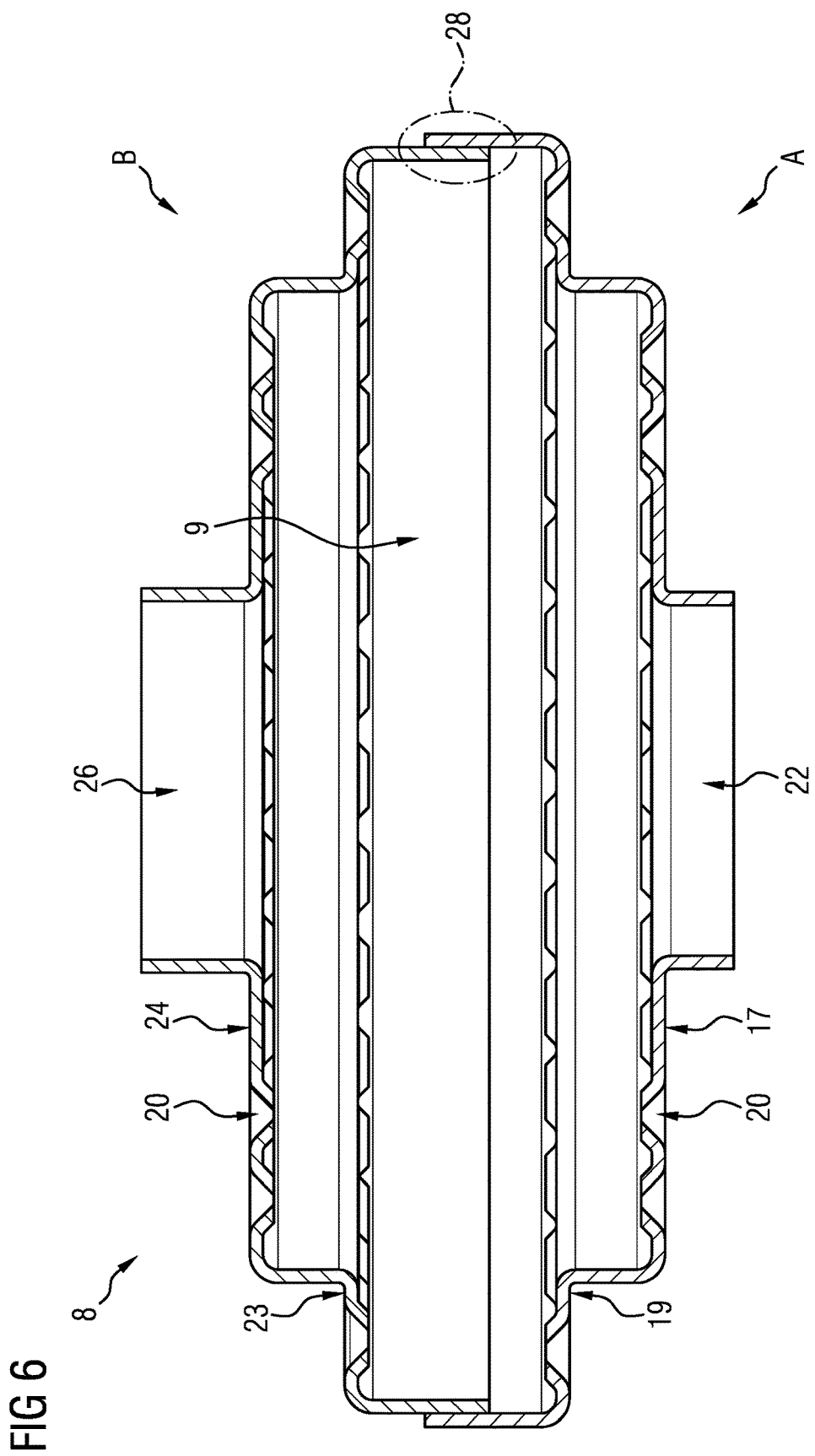

LIQUID COLLECTION AND EVAPORATION DEVICE

CROSS-REFERENCE TO RELATED APPLICATIONS

This application claims the benefit of European Application EP17465516.7, filed Apr. 21, 2017. The disclosure of the above application is incorporated herein by reference.

FIELD OF THE INVENTION

The invention relates to a liquid collection and evaporation device for use between a cooling water regulating valve of a vehicle and an actuator device for actuating the valve. The invention furthermore relates to a valve unit including such a liquid collection and evaporation device, and to a vehicle with such a valve unit.

BACKGROUND OF THE INVENTION

Cooling water regulating valves intended for vehicles, i.e. passenger vehicles or commercial vehicles, are used in cooling water circuits of internal combustion engines. Such a valve may be sealed in relation to the surrounding periphery. In principle, valves of this type are of tight or virtually tight design. Nevertheless, however, a certain leakage may occur, in particular after a certain aging time of the valve, after which a sealing action of the valve seals may decrease.

SUMMARY OF THE INVENTION

It is an object of an embodiment of the present invention to provide a device which prevents a leakage in conjunction with a cooling water regulating valve of the type described previously in relation to the periphery surrounding the valve.

This object is achieved by claim 1 which protects a liquid collection and evaporation device. Advantageous embodiments of the invention are the subject matter of the dependent claims.

A liquid collection and evaporation device is proposed, including a separation tank for collecting and evaporating liquid droplets emerging from the cooling water regulating valve.

A separation tank should be understood here as meaning a tank which provides a corresponding volume in order to be able to collect a possible leakage of the valve and to bring the leakage to evaporation. The separation tank therefore acts as a compensating means for a cooling water regulating valve, the tightness of which cannot be 100% ensured, in particular not after a certain aging.

The separation tank has a connection to the valve and a connection to the actuator device. The separation tank furthermore has a multiplicity of openings which firstly prevent the liquid droplets from emerging out of the tank and secondly permit droplet evaporation because of waste heat of an internal combustion engine, the waste heat acting on the tank.

The liquid collection and evaporation device proposed therefore collects a possible—for example aging-induced—leakage of the cooling water regulating valve and allows the leakage to evaporate in the separation tank in order then to be able to remove same in vapor form to the surroundings via the openings of the separation tank. The device therefore prevents cooling water from emerging from the cooling water regulating valve into the valve-surrounding periphery of the internal combustion engine.

The separation tank is provided here with the openings on at least one end side facing the valve and/or the actuator, via which openings the evaporated leakage liquid is removed to the surroundings.

The openings here have a shape holding back the liquid droplets by those portions of the separation tank which form the openings extending into the interior of the separation tank such that they form an encircling elevation in the interior of the separation tank. It is thereby ensured that only the evaporated leakage liquid is removed to the surroundings.

The diameter of the openings tapers here in the direction of the separation tank. The openings may be, for example, of conical design and the diameters thereof taper in the direction of the interior of the separation tank.

The connection to the valve and the connection to the actuator device are expediently designed here in a liquid-tight manner. It is thereby ensured that no leakage liquid emerges via these connections into the surroundings.

According to an aspect of the present invention, the separation tank includes at least two trays which are connected to one another in a liquid-tight manner and form a collection and evaporation volume, wherein at least one of the two trays is provided with the openings via which the evaporated leakage liquid is removed to the surroundings. However, the two trays may also be provided with the openings.

The trays may be formed from a deformed metal sheet into which the openings are punched and, in the process, the sheet metal portions forming the openings are deformed into the interior of the separation tank such that they form an encircling elevation in the interior of the separation tank, the elevation preventing the leakage liquid from emerging out of the separation tank.

A valve unit with a cooling water regulating valve, an actuator device for actuating the valve and a liquid collection and evaporation device of the type previously described is furthermore proposed, wherein the liquid collection and evaporation device is arranged between the cooling water regulating valve and the actuator device. Claim 10 protects such an arrangement.

Furthermore, a vehicle with a valve unit of the type previously described is proposed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention is explained in detail below with reference to Figure illustrations. Further advantageous developments of the invention emerge from the dependent claims and the description below of preferred embodiments. To this end:

FIG. 3 shows an enlarged detail of the liquid collection and evaporation device in a sectional illustration, FIG. 4 shows a further enlarged detail of the liquid collection and evaporation device in a sectional illustration, FIG. 5 shows two sheet metal trays forming the liquid collection and evaporation device, and FIG. 6 shows the sheet metal trays shown in FIG. 5 in the joined state.

DETAILED DESCRIPTION OF THE PREFERRED EMBODIMENTS

The following description of the preferred embodiment(s) is merely exemplary in nature and is in no way intended to limit the invention, its application, or uses.

Figure 1:
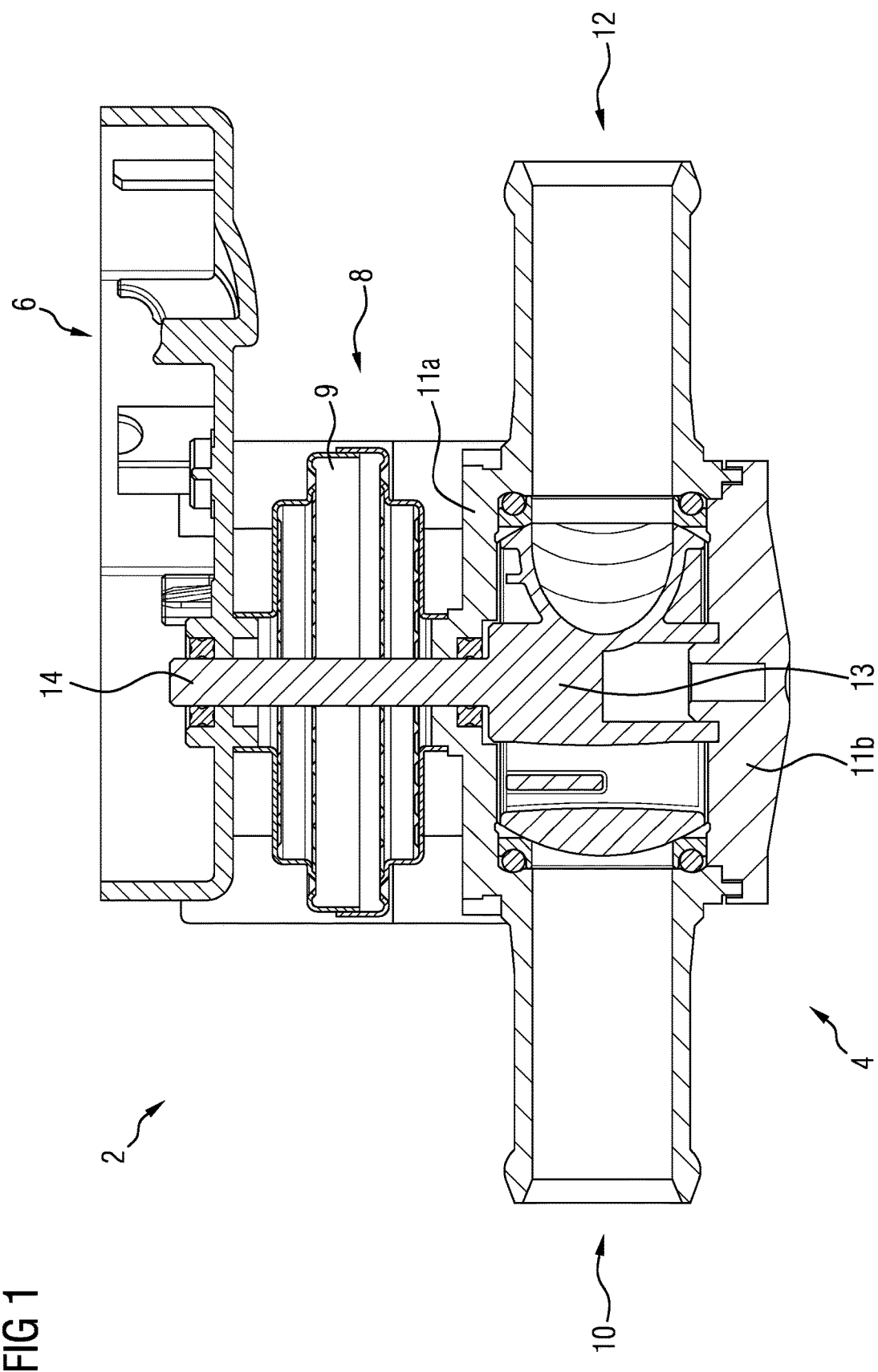
FIG. 1 shows a valve unit with a liquid collection and evaporation device in a sectional illustration.

FIG. 1 illustrates a valve unit 2 in a sectional illustration. The valve unit 2 here includes an arrangement consisting of a multi-way cooling water regulating valve 4, an actuator device 6 and also a liquid collection and evaporation device 8 which is arranged between the multi-way cooling water regulating valve 4 and the actuator device 6. The multi-way cooling water regulating valve 4 includes a valve housing 11a, 11b with the valve connectors 10, 12. Arranged pivotably within the valve housing 11a, 11b is a valve body 13 from which a valve stem 14 extends through the housing part 11a and through the liquid collection and evaporation device 8 and into the actuator device 6 in which the valve stem 14 interacts with a final control element actuated by an electric motor.

Figure 2:
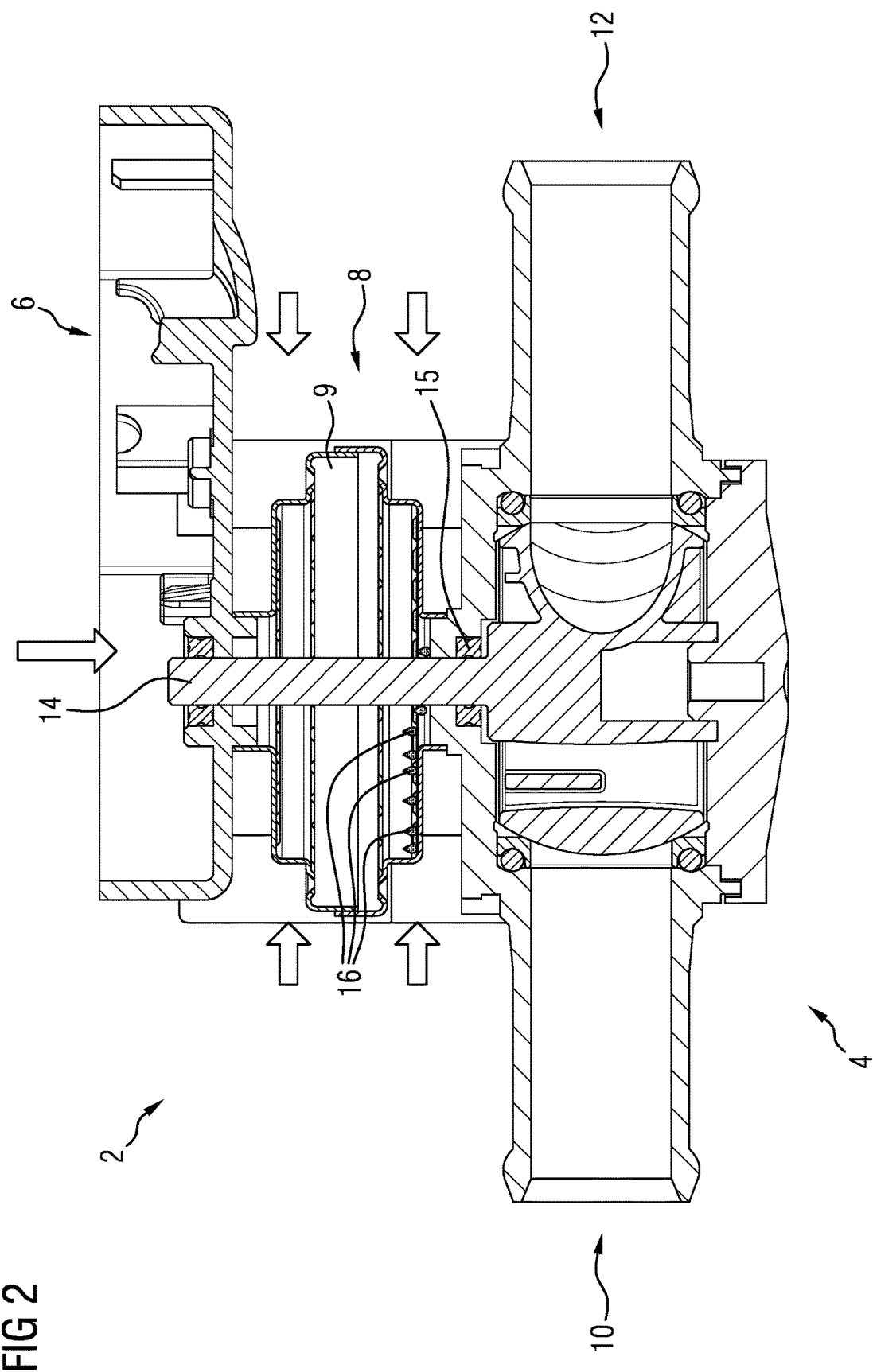
FIG. 2 shows the valve unit from FIG. 1 in a sectional illustration and with an illustrated leakage liquid and an illustrated thermal action on the liquid collection and evaporation device.

The liquid collection and evaporation device 8 includes a separation tank 9 which is connected to the valve 4 in a liquid-tight manner via the portion 22 via which the liquid droplets 16 emerging from the valve 6 are collected by the separation tank 9 (FIG. 1, FIG. 3). The separation tank 9 is also connected to the actuator device 6 in a liquid-tight manner via the portion 26 (FIG. 1, FIG. 4). The portions 22, 26 of the tank 9 may be adhesively bonded here in a liquid-tight manner to the valve 4 or to the actuator device 6 or may be connected in a liquid-tight manner thereto by cold welding or laser welding. FIG. 2 illustrates liquid droplets 16 which enter the tank 9 via a stem-side seal 15 of the valve 4.

The separation tank 9 has, both on the valve side and on the actuator side, a multiplicity of openings 20 (FIG. 3, FIG. 4) which firstly prevent the liquid droplets 16 from emerging out of the tank 9 and secondly permit droplet evaporation 18 because of waste heat on the part of an internal combustion engine, the waste heat acting on the tank 9 and being illustrated by arrows printed in bold.

FIG. 3 illustrates the design, which faces the valve 4, of the openings 20 which are formed on two end sides 18, 19 offset with respect to each other. FIG. 3 furthermore also illustrates the liquid droplets 16 which enter the tank 9 via the stem-side seal 15 of the valve 4, the waste heat—in the form of the arrows printed in bold—acting on the tank 9, and also the leakage liquid vapor 18 which is finally removed to the surroundings via the openings 20. The advantageous design of the openings 20 which have a shape holding back the liquid droplets 16 is also seen here. This is caused by the fact that those portions of the wall of the separation tank 9 which form the openings 20 extend into the interior of the tank 9 such that they form an encircling elevation in the interior of the tank 9, the elevation holding back the liquid droplets 16. The openings 20 here are of conical design, wherein the diameter of the openings 20 tapers in the direction of the tank 9.

FIG. 4 by contrast illustrates the design, facing the actuator device, of the openings 20 which are likewise formed on two end sides 23, 24 offset with respect to each other. FIG. 4 furthermore also illustrates the leakage liquid vapor 18 which is removed into the surroundings via the openings 20.

The separation tank 9 is formed by two circular metal sheets A, B which are deformed in the manner of a plate or in the manner of a tray and are joined and connected in a liquid-tight manner to each other (FIG. 3, FIG. 4, FIG. 5) and which, after being joined (FIG. 6), form a corresponding collection and evaporation volume. The sheet metal plates or sheet metal trays A, B may be adhesively bonded to each other here or else may be connected to each other by cold welding or laser welding. The liquid-tight connection is formed here in the region 28 in which the two sheet metal plates or sheet metal trays A, B overlap with each other when pushed one inside the other (FIG. 6).

The metal sheets A, B are deformed here in such a manner that they each have two sheet metal portions (FIG. 3, FIG. 4 in conjunction with FIG. 5) which are mutually offset in the longitudinal direction, form end sides 18, 19, 23, 24, are arranged substantially parallel to each other and into which the openings 20 of conical design are punched. In this case, the sheet metal portions forming the openings 20 are deformed into the interior of the separation tank 9 such that they form an encircling elevation in the interior of the separation tank 9, the elevation holding back the liquid droplets 16 (FIG. 3).

Although exemplary embodiments have been described in the preceding description, it should be emphasized that a multiplicity of modifications is possible. In addition, it should be emphasized that the exemplary embodiments are merely examples which are not intended in any way to restrict the scope of protection, the uses and the design. On the contrary, the preceding description provides a person skilled in the art with a guide for using at least one exemplary embodiment, wherein diverse amendments, in particular in respect of the function and arrangement of the described components, may be undertaken without departing from the scope of protection as emerges from the claims and these equivalent combinations of features.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liquid collection and evaporation device for use between a cooling water regulating valve and an actuator device for actuating the cooling water regulating valve, comprising:
   a separation tank for collecting and evaporating liquid droplets emerging from the cooling water regulating valve;
   a first connection which connects the valve to the separation tank;
   a second connection which connects the actuator device to the separation tank; and
   a multiplicity of openings formed as part of the separation tank;
   wherein the multiplicity of openings prevent the liquid droplets from emerging from the tank and permit droplet evaporation when the tank is exposed to waste heat.

2. The device of claim 1, wherein the separation tank is provided with the openings on at least one end side facing the valve.

3. The device of claim 1, wherein the separation tank is provided with the openings on at least one end side facing the actuator.

4. The device of claim 1, each of the multiplicity of openings further comprising a shape such that a portion of each of the multiplicity of openings extends into the interior of the separation tank, forming an encircling elevation in the interior of the separation tank, holding back the liquid droplets.

5. The device of claim 4, wherein the diameter of each of the multiplicity of openings tapers in the direction of the separation tank.

6. The device of claim 5, each of the multiplicity of openings being of conical design.

7. The device of claim 1, wherein the first connection between the separation tank and the valve is liquid-tight.

8. The device of claim 1, wherein the second connection between the separation tank and the actuator device is liquid-tight.

9. The device of claim 1, the separation tank further comprising:
   at least two trays which are connected to one another in a liquid-tight manner; and
   a collection and evaporation volume formed by the connection of the at least two trays;
   wherein at least one of the multiplicity of openings is formed as part of at least one of the two trays.

10. The device of claim 9, wherein a portion of the multiplicity of openings is formed as part of one of the at least two trays, and another porton of the multiplicity of openings is formed as part of another of the at least two trays.

11. The device as claimed in claim 9, further comprising:
    a first metal sheet, a first of the at least two trays is formed by deforming the first metal sheet, and a portion of the multiplicity of openings are formed into the first metal sheet; and
    a second metal sheet a second of the at least two trays is formed by deforming the second metal sheet, and a portion of the multiplicity of openings are formed into the second metal sheet;
    wherein each of the multiplicity of openings are deformed into the interior of the separation tank such that the multiplicity of openings form an encircling elevation in the interior of the separation tank.

12. A valve unit, comprising:
    a cooling water regulating valve;
    an actuator device for actuating the valve;
    a liquid collection and evaporation device arranged between the cooling water regulating valve and the actuator device, the liquid collection and evaporation device further comprising:
    a separation tank for collecting and evaporating liquid droplets emerging from the cooling water regulating valve;
    a first connection which connects the valve to the separation tank;
    a second connection which connects the actuator device to the separation tank; and
    a multiplicity of openings formed as part of the separation tank;
    wherein the multiplicity of openings prevent the liquid droplets from emerging from the tank and permit droplet evaporation when the tank is exposed to waste heat.

13. The valve unit of claim 12, wherein the separation tank is provided with the openings on at least one end side facing at least one of the valve or the actuator.

14. The valve unit of claim 12, each of the multiplicity of openings further comprising a shape such that a portion of each of the multiplicity of openings extends into the interior of the separation tank, forming an encircling elevation in the interior of the separation tank, holding back the liquid droplets.

15. The valve unit of claim 14, wherein the diameter of each of the multiplicity of openings tapers in the direction of the separation tank.

16. The valve unit of claim 15, each of the multiplicity of openings being of conical design.

17. The valve unit of claim 12, wherein the first connection between the separation tank and the valve is liquid-tight, and the second connection between the separation tank and the actuator device is liquid-tight.

18. The valve unit of claim 12, the separation tank further comprising:
    at least two trays which are connected to one another in a liquid-tight manner; and
    a collection and evaporation volume formed by the connection of the at least two trays;
    wherein at least one of the multiplicity of openings is formed as part of at least one of the two trays.

19. The valve unit of claim 18, wherein a portion of the multiplicity of openings is formed as part of one of the at least two trays and another porton of the multiplicity of openings is formed as part of another of the at least two trays.

20. The device as claimed in claim 18, further comprising:
    a first metal sheet, a first of the at least two trays is formed by deforming the first metal sheet, and a portion of the multiplicity of openings are formed into the first metal sheet; and
    a second metal sheet a second of the at least two trays is formed by deforming the second metal sheet, and a portion of the multiplicity of openings are formed into the second metal sheet;
    wherein each of the multiplicity of openings are deformed into the interior of the separation tank such that the multiplicity of openings form an encircling elevation in the interior of the separation tank.

\* \* \* \* \*